United States Patent [19]

Noguchi et al.

[11] 4,095,565
[45] Jun. 20, 1978

[54] METHOD OF OPERATING AN INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 651,584

[22] Filed: Jan. 22, 1976

Related U.S. Application Data

[62] Division of Ser. No. 434,216, Jan. 17, 1974, Pat. No. 3,974,818.

[30] Foreign Application Priority Data

| Jan. 22, 1973 | Japan | 48-9748 |
| Feb. 27, 1973 | Japan | 48-23919 |
| Mar. 8, 1973 | Japan | 48-27277 |
| Apr. 3, 1973 | Japan | 48-38467 |
| Oct. 31, 1973 | Japan | 48-123227 |

[51] Int. Cl.$^2$ .............................................. F02B 3/00
[52] U.S. Cl. ............................ 123//32 SP; 123/75 B; 123/32 L
[58] Field of Search ............ 123/32 ST, 32 SP, 75 P, 123/191 S, 191 SP

[56] References Cited

U.S. PATENT DOCUMENTS

| 2,435,659 | 2/1948 | Summers | 123/32 SP |
| 3,230,939 | 1/1966 | Goossak | 123/32 SP |
| 3,270,721 | 9/1966 | Hideg et al. | 123/32 ST |
| 3,283,751 | 11/1966 | Goossak et al. | 123/32 ST |
| 3,926,158 | 12/1975 | Dolza | 123/32 ST |

Primary Examiner—Ronald B. Cox
Attorney, Agent, or Firm—Cushman, Darby & Cushman

[57] ABSTRACT

A method of operating a torch ignition type internal combustion engine having a main combustion chamber and a trap chamber always communicated therewith through first and second apertures provided in the trap chamber has the steps of supplying a charge of a lean air-fuel mixture into the main combustion chamber through an intake port and introducing another charge of a rich air-fuel mixture through the first aperture into the trap chamber. The rich air-fuel mixture charge is substituted in the trap chamber for residual gases produced therein during the preceding combustion stroke to discharge the residual gases through the second aperture whereby the trap chamber is scavenged. A substantial part of the rich air-fuel mixture charge is retained in the trap chamber during a compression stroke and then ignited to produce therein a combustion flame which is then caused to spurt as torch jets through the first and second apertures into the main combustion chamber to ignite and burn the lean air-fuel mixture charge therein for thereby producing power in the main combustion chamber. The lean air-fuel mixture charge is too lean to be ignitable by spark-ignition while the rich air-fuel mixture charge is relatively rich. The mean air-fuel ratio of the total of the rich and lean air-fuel mixture charges is much leaner than the air-fuel ratio for conventional spark-ignition type internal combustion engines, whereby the invention greatly reduces the harmful components of engine exhaust gas.

16 Claims, 14 Drawing Figures

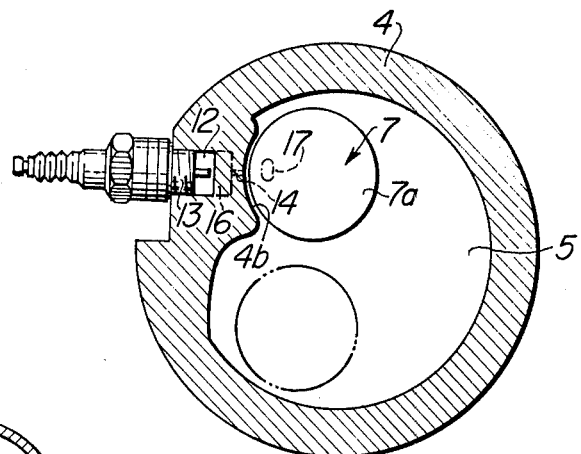
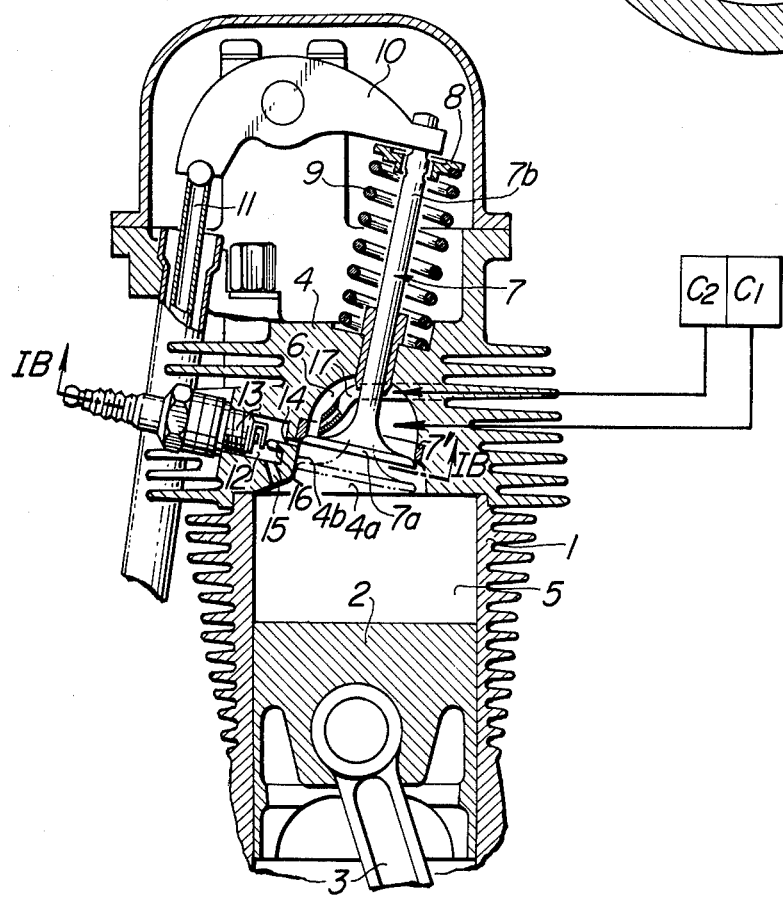

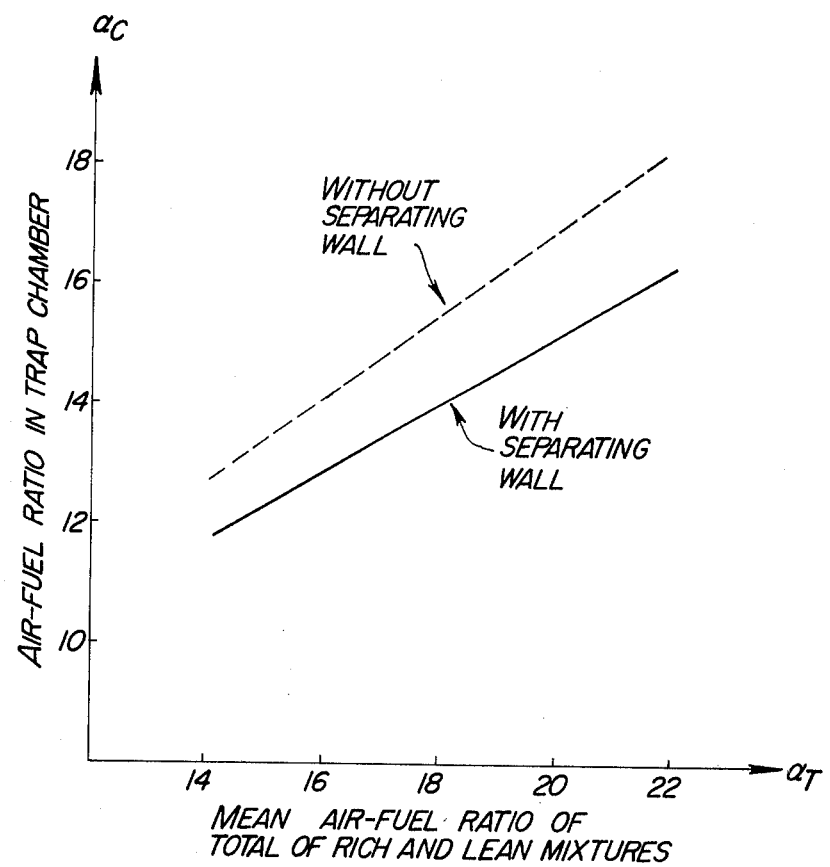

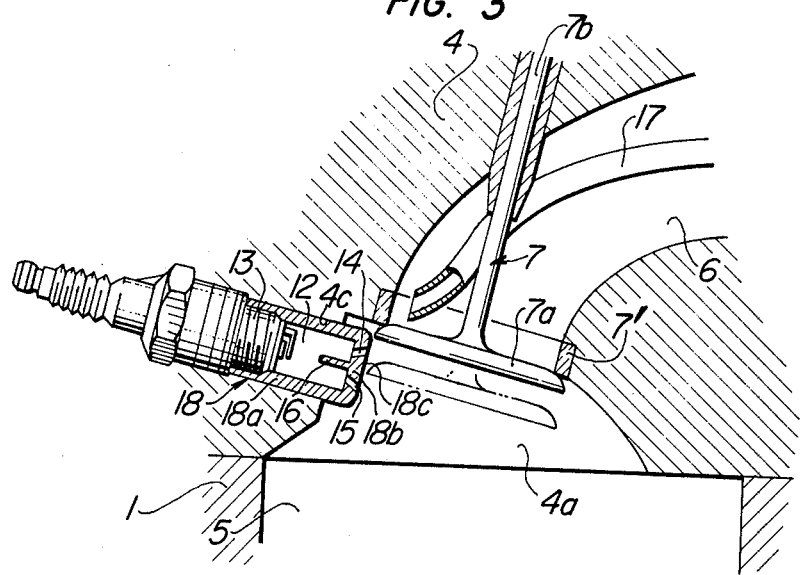
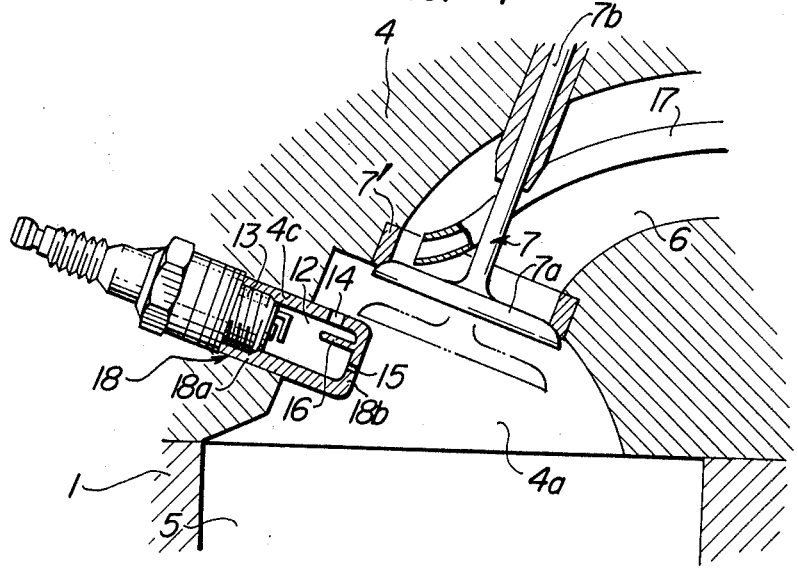

METHOD OF OPERATING AN INTERNAL COMBUSTION ENGINE

CROSS-REFERENCE TO A RELATED APPLICATION

This application is a division of our copending application Ser. No. 434,216 filed Jan. 17, 1974, now U.S. Pat. No. 3,974,818.

BACKGROUND OF THE INVENTION

1. Field of the Invention

The present invention relates to a method of operating a torch ignition type internal combustion engine which is intended to reduce the harmful exhaust gases which give rise to public pollution.

2. DESCRIPTION OF THE PRIOR ART

It has been known that the amount of the harmful gaseous combustion products, such as nitrogen oxides ($NO_x$), carbon monoxide (CO) and hydrocarbon (HC), exhausted by an internal combustion engine is closely related to the air-fuel ratio of the air-fuel mixture supplied to the engine for combustion therein. It is also known that the combustion of the air-fuel mixture at a large air-fuel ratio (i.e., lean mixture) reduces the amount of the harmful exhaust gases compared to an air-fuel mixture at a small air-fuel ratio (i.e., rich mixture). However, since the ignitability of the air-fuel mixture by a spark plug is limited depending upon the air-fuel ratio, it is impossible to produce ignition by the spark plug when the lean mixture is at an air-fuel ratio outside the limited range. Thus, in order to reduce harmful exhaust gases by means of the lean mixture combustion, some other means for igniting the lean mixture is required. It has been known that a stratified combustion system is one of the means for enabling the ignition of the lean mixture. The stratified combustion system has such an arrangement that a stratified rich mixture is formed and held adjacent the electrodes of a spark plug in the combustion chamber while a stratified lean mixture is formed and held in the other parts of the chamber. The lean mixture is ignited by a torch jet produced by spark-ignition of the rich mixture.

In general, the stratified combustion can be effectively performed in a so-called "torch ignition engine" which comprises a main chamber for receiving the lean mixture, a divided or auxiliary combustion chamber for receiving the rich mixture and a spark plug having electrodes disposed in the auxiliary combustion chamber. The achievement of stratified combustion is due to the fact that the division of a combustion chamber into two chambers advantageously assures the stratification of the two kinds of mixtures. However, it will be apparent that, even in a torch ignition engine of such a structure, the achievement of stratified combustion depends generally rally upon the extent to which the two stratified mixtures are maintained. Namely, in order that the stratified combustion may accomplish its best performance, it must be assured that an ignitable rich mixture be held within the divided combustion chamber while a lean mixture at an intended air-fuel ratio is held within the main chamber.

A typical torch ignition engine of the prior art is provided with a divided combustion chamber having a suction aperture for the flow of rich mixture thereinto and an additional intake valve solely for use with the divided chamber. The engine is so designed that the additional intake valve is opened during the suction stroke to allow the rich mixture to be directly introduced into the divided combustion chamber. The additional intake valve, however, inevitably complicates the cylinder head of the engine with a corresponding increase in the cost of manufacture of the engine.

U.S. Pat. No. 3,382,850 shows a torch ignition engine which does not require any additional valve for use only with a divided chamber. The engine, however, is not of the type that a rich mixture is directly introduced into its divided combustion chamber during a suction stroke but is of a design that the rich mixture is introduced into the divided chamber during the compression stroke. The divided combustion chamber is simply provided with a single or a plurality of discharge apertures opened to the main chamber. The discharge aperture or apertures are disposed at a substantial distance from the rich mixture supply passage. These facts lead to the problem that residual gases cannot be scavenged out of the divided chamber sufficiently to enable the chamber to be supplied with rich mixture of an amount that assures a reliable succeeding ignition, with the result that the engine does not assure a reliable continuous stratified combustion.

SUMMARY OF THE INVENTION

The present invention aims to provide a method of operating a torch ignition type internal combustion engine which assures a reliable introduction of separate charges of air-fuel mixtures into a main combustion chamber and an auxiliary combustion chamber or "trap chamber" during a suction stroke of the engine without the use of a complicated cylinder head to thereby provide an improved stratified charge.

The present invention also aims to assure an improved scavenging of the trap chamber by introducing the charge of an air-fuel mixture into the trap chamber through a first aperture therein during the suction stroke of the engine and by substituting in the trap chamber the air-fuel mixture charge for residual gases produced therein during the preceding combustion stroke of the engine thereby to discharge the residual gases through a second aperture in the trap chamber.

The present invention further aims to ensure reliable and improved ignition and combustion of the air-fuel mixture charge in the main combustion chamber by first igniting the air-fuel mixture charge introduced into the trap chamber to produce a combustion flame therein and by spurting the combustion flame as torch jets from the trap chamber through the first and second apertures into the main combustion chamber.

According to the present invention, there is provided a method of operating an internal combustion engine having a main combustion chamber, an intake port connected to the main combustion chamber, and a trap chamber provided with first and second apertures through which the trap chamber is communicated with the main combustion chamber, the method includes the steps of: (a) supplying a charge of air-fuel mixture into the main combustion chamber through the intake port during a suction stroke of the engine; (b) introducing another charge of air-fuel mixture through the first aperture into the trap chamber during the suction stroke of the engine; (c) substituting in the trap chamber the other charge of air-fuel mixture for residual gases produced in the trap chamber during the preceding combustion stroke of the engine to discharge the residual gases through the second aperture for thereby scavenging the trap chamber; (d) maintaining a substantial part of the other charge of air-fuel mixture in the trap chamber during a compression stroke of the engine; (e) igniting the part of the other charge of air-fuel mixture in the trap chamber to produce a combustion flame therein; (f) spurting the combustion flame in the form of torch jets from the trap chamber into the main combustion chamber through the first and second apertures; and (g) burning, by the torch jets, the charge of air-fuel mixture supplied to the main combustion chamber to produce power therein.

The introducing step may include a further step of guiding the other charge of air-fuel mixture introduced into the trap chamber through the first aperture to the vicinity of a set of electrodes of a spark plug which may be either disposed in or exposed to the trap chamber.

The method of the present invention may preferably include further steps of moving, prior to the introducing step, an intake valve of the engine to a position in which the first aperture in the trap chamber is positioned above the valve head of the intake valve and guiding, by a part of the back face of the valve head, the other charge of air-fuel mixture from the intake port to the first aperture.

The method of the invention may include a further step of supplying the other charge of air-fuel mixture toward the first aperture through a passage at least a part of which is independent of the intake port. The passage may be closed by the intake valve when it is moved to its closed position.

The substituting step of the method of the invention may preferably include a further step of causing the other charge of air-fuel mixture introduced into the trap chamber through the first aperture and the residual gases being discharged from the trap chamber through the second aperture to flow within the trap chamber in a stratified fashion.

The other charge of air-fuel mixture may advantageously be richer than the air-fuel mixture charge introduced into the main combustion chamber.

In one form of the torch ignition engine in which the casing defining therein the trap chamber protrudes into the main combustion chamber and the first aperture for the trap chamber is formed in the top side of the casing, the intake valve may be moved, prior to the introducing step, to a position in which the first aperture is positioned substantially in juxtaposed relationship with the valve head, rather than above the valve head, so that the other charge of air-fuel mixture is guided by a part of the valve head from the intake port to the first aperture.

The above and other objects, features and advantages of the invention will be made apparent by the following description with reference to the accompanying drawings.

BRIEF DESCRIPTION OF DRAWINGS

FIG. 1A is a partial sectional side view of a torch ignition type internal combustion engine operated according to the present invention;

FIG. 1B is a fragmentary sectional view of the engine illustrated in FIG. 1A taken along line IB — IB in FIG. 1A;

FIG. 2 is a graphical illustration of test results showing the advantageous effect of a separating wall provided in the engine;

FIG. 3 is a fragmentary partial sectional view of a modified torch ignition type internal combustion engine;

FIG. 4 is a fragmentary sectional view of another modified torch ignition type internal combustion engine;

DESCRIPTION OF PREFERRED EMBODIMENTS

Figure 5:
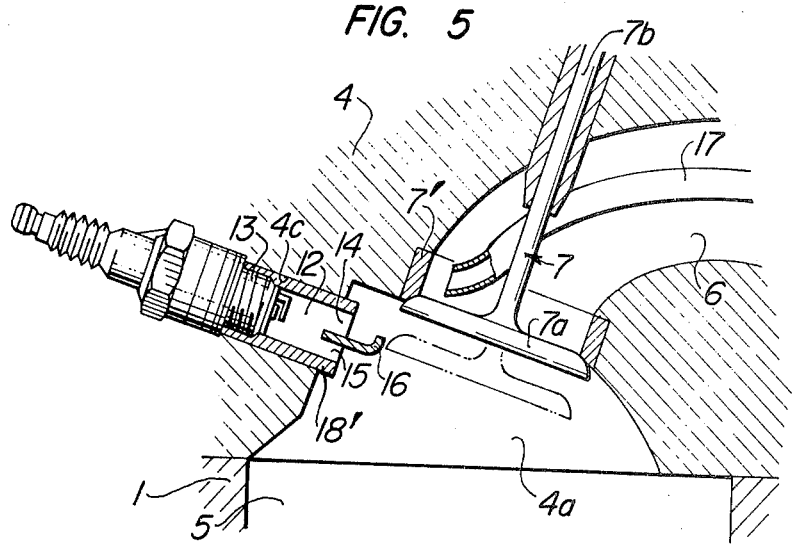
FIG. 5 is a fragmentary sectional view of a further modified torch ignition type internal combustion engine.

Referring first to FIGS. 1A and 1B, the internal combustion engine operated by the invention has a cylinder 1 having an outer periphery provided with fins for ensuring the effective cooling of the engine. A piston 2 is mounted in the cylinder 1 and is drivingly connected to a crank mechanism (not shown) by means of a connecting rod 3 so that the reciprocal motion of the piston is converted by the crank mechanism into a rotary motion of a crank shaft (not shown) of the engine. A cylinder head 4 is mounted on the top (the upper end as viewed in FIG. 1A) of the cylinder 1. The surface of the cylinder head 4 facing the interior of the cylinder 1 cooperates with the inner peripheral surface of the cylinder and the top end face of the piston 2 to define a main chamber 5. On the surface of the cylinder head 4 facing the interior of the cylinder 1, there is formed a recess 4a defining a part of the main chamber 5. The cylinder head 4 also has its outer periphery formed with cooling fine similar to those on the cylinder 1.

An intake or suction port 6 which is formed in the cylinder head 4 is communicated with the main chamber 5 and, particularly, with the recess 4a. An intake valve 7 and a valve seat 7' are provided between the suction port 6 and the combustion chamber 5. The intake valve 7 comprises a valve head 7a and a valve stem 7b. The valve head 7a is so positioned as to cooperate with the valve seat 7' while the valve stem 7b has an end portion extending from the cylinder head 4 outwardly beyond the top (the upper end as viewed in FIG. 1A) thereof. A spring retainer 8 is provided on the valve stem 7b adjacent to its outer end extremity. A spring 9 is mounted around the valve stem 7b and extends between the spring retainer 8 and the cylinder head 4. The valve stem 7b is operatively connected at its end to a rocker arm 10 which in turn is operatively connected to the crank shaft by means of a push rod 11 and a cam shaft (not shown) so that the valve 7 is reciprocated in accordance with the rotation of the crank shaft, i.e., the reciprocal motion of the piston 2, with a result that the valve head 7a is moved into and out of sealing engagement with the valve seat 7' to alternately close and open the suction port 6.

The suction port 6 is in communication with a main carburetor $C_1$ and an air cleaner (not shown) and cooperates to lead or introduce into the main chamber 5 a mixture (i.e., an air-fuel mixture charge at a relatively large air-fuel ratio) produced and adjusted by the main carburetor or air from the main carburetor.

The engine is also provided with a trap chamber 12 in the form of a cylindrical bore formed in the cylinder head 4 and extending from the outer surface thereof a distance toward the recess 4a. A spark plug 13 is fitted into the bore 12 to close the outside end of the trap chamber. The trap chamber 12 is provided with a suction aperture 14 formed in the bottom wall of the chamber 12 and extending substantially in the axial direction thereof. The trap chamber 12 also has a discharge aperture 15 formed in the bottom wall of the chamber 12 and extending toward the interior of the cylinder 1 with an inclination to the axis of the trap chamber. The suction and discharge apertures 14 and 15 communicate the trap chamber 12 with the main chamber 5. More particularly, the suction aperture 14 is positioned on the side of the valve head 7a adjacent to the opening of the suction passage 17 in the suction port 6 when the valve 7 is opened as shown by broken lines in FIG. 1A. The discharge aperture 15 is located adjacent to the piston 2 at the top dead center and opens approximately toward the center of the upper surface of the piston. Stated in other words, the positional relationship between the valve head 7a, the suction aperture 14 and the discharge aperture 15 is such that the valve head 7a is located between the apertures 14 and 15 when the valve 7 is in its open position.

The main combustion chamber 5 has a side wall 4b provided by the part of the bottom wall of the trap chamber 12 between the suction and discharge apertures 14 and 15. The engine is so designed that at least a part of the peripheral edge of the valve head 7a is positioned in closely spaced relationship to the side wall 4b when the valve is opened. The side wall 4b has an arcuate concave cross-section substantially complementary to an adjacent part of the peripheral edge of the valve head 7a, so best shown in FIG. 1B. The arcuate concave side wall 4b extends in a direction substantially in parallel with the direction of the reciprocal movement of the valve 7 so that the valve head 7a is reciprocated with a part thereof being in closely spaced relationship with the side wall 4b.

The part of the trap chamber 12 adjacent to the main chamber 5 is divided into two spaces, one communicated with the suction aperture 14 and the other communicated with the discharge aperture 15, by a separating wall 16 extending from the bottom wall of the trap chamber 12 toward the spark plug 13, as will be seen in FIG. 1A.

A suction passage 17, which is connected at one end to an auxiliary chaburetor $C_2$ and the air cleaner (not shown), opens at the other end adjacent to the suction aperture 14 of the trap chamber 12 and directly above the valve head 7a when the intake valve 7 is in its closed position. The suction passage 17 supplies to the trap chamber 12 a rich mixture produced and adjusted by the secondary carburetor $C_2$. For this purpose, the open end of the suction passage 17 is oriented toward the suction aperture 14 of the trap chamber 12. The suction passage 17 is operative to deliver the rich mixture in the suction port 6 immediately above the valve head 7a and, when the intake valve 7 is opened, cause the rich mixture to be introduced over the junction between the suction port 6 and the main chamber 5 and through the suction aperture 14 into the trap chamber 12. The intake valve 7 is operative to assist or facilitate the introduction of the rich mixture into the trap chamber 12 as will be fully described later.

In addition to the components described, the cylinder head 4 is further provided with exhaust port and valve which, however, are substantially the same as those of the conventional internal combustion engine and thus will not be described herein.

The operation of the engine with the aforestated structure and arrangement will be described hereunder. In the suction stroke of the piston 2, the valve 7 will be opened by means of the connecting rod 3, the crank shaft (not shown), push rod 11, rocker arm 10, etc. so that the valve head 7a is moved to a position between the suction aperture 14 and the discharge aperture 15, as shown by broken lines in FIG. 1A. Thus, the suction port 6 is communicated with the main chamber 5 and, at the same time, the suction passage 17 is allowed to communicate with the trap chamber 12 through the junction between the suction port 6 and the main chamber 5 and through the suction aperture 14. As the piston 2 is moved downwardly, a lean mixture is sucked through the suction port 6 into the main chamber 5. Simultaneously, the residual gases produced in the trap chamber 12 during the preceding combustion stroke and remaining in the trap chamber are discharged mainly through the discharge aperture 15 from the trap chamber and sucked into the cylinder 1, with a result that the rich mixture delivered by the suction passage 17 is sucked from the suction port 6 into the trap chamber through the junction between the suction port 6 and the main chamber 5 and through the suction aperture 14. In other words, the residual gases remaining in the trap chamber 12 are allowed to be discharged therefrom through the discharge aperture 15 while the suction aperture 14 passes the rich mixture from the suction passage 17 and holds it in the trap chamber 12 in the suction stroke. The separating wall 16 is operative to facilitate the introduction of the rich mixture into the trap chamber 12 and hold the mixture therein. The reason for this is that the separating wall 16 partially divides the trap chamber 12 into two spaces or pockets, one directly communicated with the suction aperture 14 and the other with the discharge aperture 15, with a result that the residual gases and the rich mixture are caused to flow in a stratified fashion within the trap chamber, whereby the discharge of the residual gases through the discharge aperture 15 is advantageously carried out simultaneously with the introduction of the rich mixture through the suction aperture 14 into the trap chamber 12. State in other words, the separating wall 16 is operative to facilitate the substitution of a fresh charge of air-fuel mixture for residual gases and the scavenging of the trap chamber 12 and to eliminate a possibility that the residual gases are disadvantageously retained in the trap chamber 12 while the rich mixture is sucked through the suction aperture 14 into the trap chamber 12 and immediately flows out of the same. In addition, the separating wall 16 is also operative to guide and lead the rich mixture toward a set of electrodes of the spark plug 13 so that the electrodes are surrounded by a fresh charge of rich mixture at each time of ignition with a result that the ignition by the spark plug is improved and reliably performed.

On the way of the rich mixture from the suction passage 17 into the suction aperture 14, the rich mixture flows past the junction between the suction port 6 and the main chamber 5. At this instance, the flow of the rich mixture is guided by the intake valve 7. More specifically, because the side wall 4b of the trap chamber 12 and the valve head 7a are so arranged as to dispose a part of the periphery of the valve head 7a in closely spaced relationship to the side wall 4b, as described above, the valve head 7a guides and leads the rich mixture from the open end of the suction passage 17 to the suction aperture 14 of the trap chamber 12. In addition, since the side wall 4b in designed to have a concave arcuate shape so that the side wall 4b extends circumferentially of the valve head 7a over an increased angular range in closely spaced relationship with the valve head 7a. As discussed previously, the flow of the rich mixture to places other than the suction aperture 14 is substantially avoided with an advantageous result that the rich mixture from the suction passage 17 is introduced at an improved rate through the suction aperture 14 into the trap chamber 12.

Incidentally, the rich mixture delivered from the suction passage 17 is mixed with a certain amount of lean mixture within the suction port 6 before the rich mixture is introduced into the trap chamber 12. Thus, the rich mixture received by the trap chamber 12 will be at an air-fuel ratio which is slightly larger than that of the rich mixture within the suction passage 17.

In the compression stroke, the intake valve 7 is returned by the spring 9 to a closed position in which the valve head 7a is urged into the sealing engagement with the valve seat 7′, as shown by solid lines in FIG. 1A, to shut off the communication between the suction port 6 and the main chamber 5. Thus, the lean mixture in the main chamber 5 is compressed as the piston is moved upwardly. As the lean mixture is compressed, a part of this mixture is introduced through the suction and discharge apertures 14 and 15 into the trap chamber 12 with a result that the rich mixture in the trap chamber is weakened or diluted and compressed. In this way, the rich mixture in the trap chamber 12 will be diluted appropriately so that the mixture in the trap chamber 12 is at an air-fuel ratio most suited for the ignition by the spark plug 13 at a most properly adjusted time of ignition.

When the thus diluted rich mixture in the trap chamber 12 is ignited by a spark produced between the electrodes of the spark plug 13 to form a combustion flame in the trap chamber, the combustion flame will spurt as torch jets through the suction and discharge apertures 14 and 15 into the main chamber 5 with a result that the lean mixture within the main chamber 5, which mixture itself is so lean that it is not ignited by a conventional spark ignition, can be ignited by the torch jets to produce a complete combustion. After the combustion of the rich and lean mixtures, the engine performs its expansion stroke to complete a cycle of operation as in conventional four-stroke cycle engines.

A reliable operation of the engine will be assured by the following example: The lean mixture to be introduced from the suction port 6 into the main chamber 5 is at an air-fuel ratio of from 20 to 30; the rich mixture to be sucked from the suction passage 17 into the trap chamber 12 is at an air-fuel ratio of from 2 to 6; and the relative flow percentage of the rich mixture is from 5 to 15% of the total flow of both mixtures.

The engine will achieve a stratified combustion with an advantageous result that harmful exhaust gases are reduced. Advantageously, the engine does not require any additional intake valve for use with the trap chamber only. This makes it possible to stratify lean and rich mixtures without the use of a cylinder head of very complicated structure. The suction and discharge apertures 14 and 15 for the trap chamber 12 are operative to advantageously reliably facilitate the stratification of rich and lean mixtures within the combustion chamber, which leads to an improvement in the reduction in the production of harmful exhaust gases. The separating wall 16 provided between the suction and discharge apertures 14 and 15 for the trap chamber 12 further facilitates the trapping of rich mixture within the trap chamber 12.

With respect to the effect of the separating wall 16, the inventors have conducted tests to compare the air-fuel ratio obtained within the trap chamber 12 having the separating wall 16 with the air-fuel ratio obtained within a similar trap chamber which is not provided with such a seaprating wall. FIG. 2 graphically illustrates the results of the tests, wherein the abscissa represents the mean air-fuel ratio $\alpha T$ of the rich and lean mixtures while the ordinate represents the air-fuel ratio $\alpha_C$ obtained within the trap chamber just prior to ignition. The solid line in FIG. 2 shows the result of the test on the engine having the separating wall 16 while the broken line illustrates the result of the test on the other engine without the separating wall. It will be apparent from the test results that the provision of the separating wall 16 in the trap chamber 12 is effective to trap within the trap chamber a charge of air-fuel mixture at a richer air-fuel ratio $\alpha_C$ for the same mean air-fuel ratio $\alpha_T$; in other words, the separating wall 16 makes it possible to use a total charge at a leaner air-fuel ratio for the same air-fuel ratio $\alpha_C$ in the trap chamber 12. Thus, the separating wall 16 advantageously improves the stratified combustion and, thus, contributes to the reduction of harmful exhaust gases.

In the described invention, the trap chamber 12 is formed by boring the cylinder head 4. This design requires skilled machining operation. Particularly, it is very difficult to form the separating wall 16 in the case wherein the trap chamber 12 is formed by boring. The engines shown in FIGS. 3 to have been designed to eliminate these difficulties. Each of these alternative engines utilizes a separate casing member which, when installed in an associated engine, is designed to define a trap chamber in the engine. It will be sufficient for an associated cylinder head to be formed therein with a simple bore or hole for detachably receiving the casing member.

Referring particularly to FIG. 3, the engine shown therein has a cylinder head 4 which is provided with a bore 4c extending therethrough from the outer periphery to a main combustion chamber 5. The bore 4c detachably or removably receives a generally cup-shaped casing 18 comprising a cylindrical portion 18a and a bottom 18b. The casing 18 defines therein a trap chamber 12 whose bottom 18b projects into the main combustion chamber 5 so that a part of the peripheral edge of a valve head 7a of an intake valve 7, when opened, is positioned adjacent to an intermediate portion of the bottom 18*b* of the casing 18, as shown by broken lines in FIG. 3. A spark plug 13 is so disposed as to close an outer open end of the cylindrical portion 18*a* of the casing 18. In its bottom 18*b*, there are provided a suction aperture 14 and a discharge aperture 15. The suction aperture 14 is opened toward the suction port 6 with regard to the valve head when it is in its open position whereas the discharge aperture 15 is opened toward the opposite side thereof.

The casing 18 has a separating wall 16 provided on the bottom 18*b* between the suction and discharge apertures 14 and 15 and extending to the inside of the trap chamber, i.e., toward the spark plug 13. The outer surface of the bottom 18*b* of the casing 18 provides the main chamber 5 with a side wall portion 18*c* which preferably has an arcuate concave shape in cross-section (though not shown) similar to that of the side wall 4*b* in the preceding embodiment.

In the engine shown in FIG. 4, a trap chamber 12 defined by a casing 18 is downwardly displaced as compared with the position of the casing 18 in the engine shown in FIG. 3 and projects further into a main chamber 5 so that, when an intake valve 7 is opened, its valve head 7*a* is positioned adjacent to a bottom 18*b* of the casing 18, as shown by broken lines in FIG. 4. Correspondingly, a suction aperture 14 of the trap chamber 12 is formed in the top side of the cylindrical portion 18*a* of the casing 18 which comes adjacent to the periperbal edge of the valve head 7*a* in its open position while a discharge aperture 15 of the trap chamber 12 is formed substantially at the center of the bottom 18*b* of the casing 18. The trap chamber 12 is provided with a separating wall 16 formed on the bottom 18*b* of the casing 18 and extends into the inside of the trap chamber 12 beyond the suction aperture 14.

The engine shown in FIG. 5 comprises a trap chamber 12 with its separating wall 16 extending into the chamber 12 as well as into a main chamber 5 beyond the end of a cylindrical or sleeve-like casing 18' which defines the trap chamber 12 therein and is detachably fitted into a bore 4*c* in a cylinder head 4. More specifically, the casing 18' has an open end at which the separating wall 16 is provided at the center of the opening and extends axially along the casing 18' to divide the openeing into two openings one of which forms a suction aperture 14 of the trap chamber 12 and the other of which forms a discharge aperture 15. The separating wall 16 has an end portion which is positioned and turned upwardly toward a suction port 6 so that a head 7*a* of an intake valve 7 when opened is positioned closely spaced relationship thereto. The end surface of the separating wall 16 is preferably formed with an arcuate concave recess (though not shown) similar to the concave surface 4*b* in the first embodiment shown in FIG. 1B.

In each of the engines shown in FIGS. 3 to 5, it is possible to form with ease the separating wall 16 integral with the casing 18 or 18'. As the casing 18 or 18' is detachable from an associated cylinder head 4, it is possible to replace a casing 18 or 18' by other replacement casings. In addition, since the trap chamber 12 of each of the engines in FIGS. 3 to 5 has its end projecting into the main chamber 5 and provided with a suction aperture 14, it is assured that the rich mixture delivered from a suction passage 17 and flowing at a high velocity over the junction between the suction port 6 and the main chamber 5 (i.e., the gap between the intake valve 7 and the valve seat 7') can be introduced at that high velocity through the suction aperture 14 into the trap chamber 12. This advantageously increases the amount of rich mixture to be received by the trap chamber from the suction passage 17 and, in addition, improves the scavenging effect on the residual gases remaining in the trap chamber 12 with a resultant improvement in the ignitability thereof.

The engines described above are shown to have cylindrical trap chambers. The trap chamber, however, is not limited to the described and illustrated shapes and, in fact, may be of another shape such as spherical shape, for example. In the case where a trap chamber is defined by a casing member, it is generally difficult to provide the bottom of the casing member with an arcuate concave recess complementary to an associated valve head. In such a case, the bottom of the casing may not be shaped but, instead, located in the engine so that a part of the periphery of the valve head is positioned adjacent to the part of the casing between the suction and discharge apertures when the valve is in its open position.

Figure 6A:
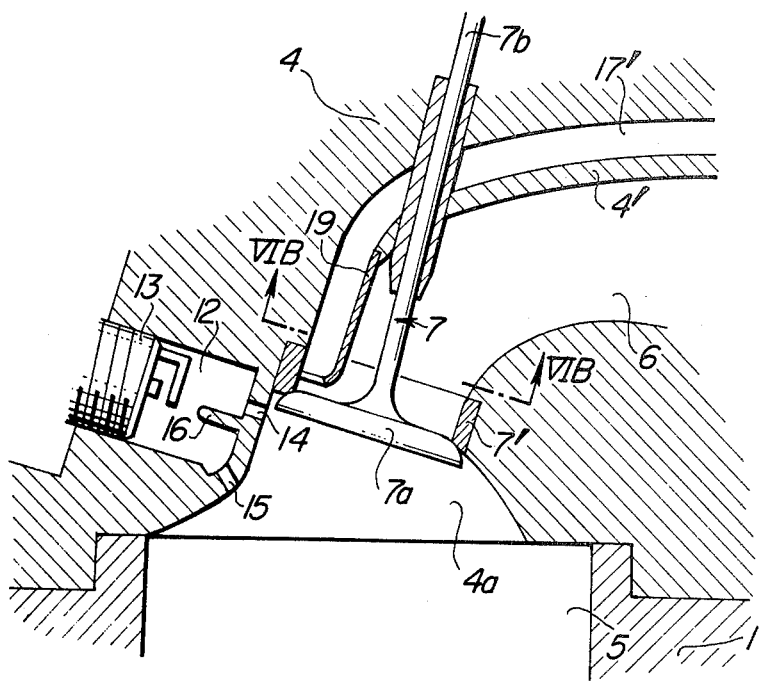
FIG. 6A is a similar view but illustrates a further modified torch ignition type internal combustion engine.
Figure 6B:
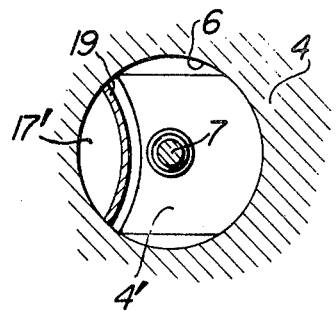
FIG. 6B is a fragmentary sectional view of the engine illustrated in FIG. 6A taken along line VIB — VIB in FIG. 6A.

The described engine have their suction passages 17 each in the form of a conduit disposed within a suction port 6. In the engine shown in FIGS. 6A and 6B, a suction passage 17' for introducing rich mixture is formed in a cylinder head 4 and separated from a lean mixture suction port 6 by a wall 4' formed integral with the cylinder head and by a partition plate 19 connected to the open end of the wall 4'. The partition plate 19 has its inner end slightly bent toward a suction aperture 14 of a trap chamber 12 which is defined by a bore in the cylinder 4.

Figure 7:
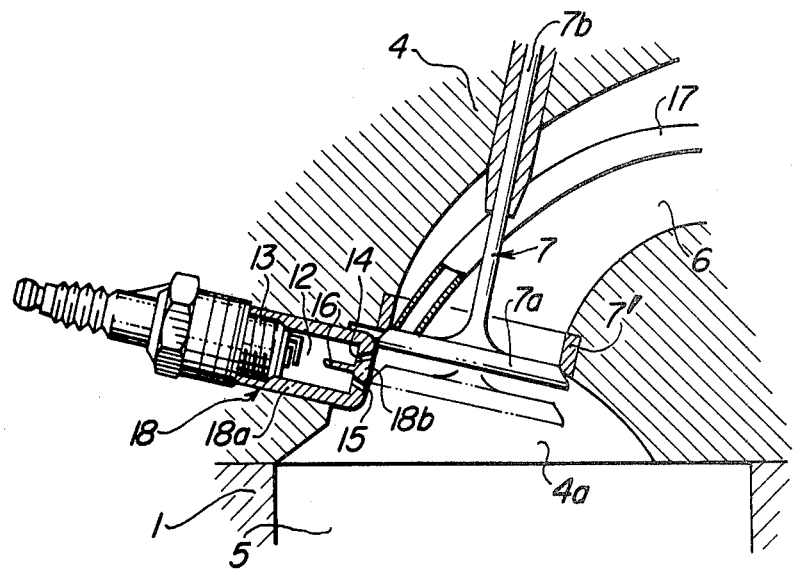
FIG. 7 is a fragmentary sectional view of a still further modified torch ignition type internal combustion engine.
Figure 8A:
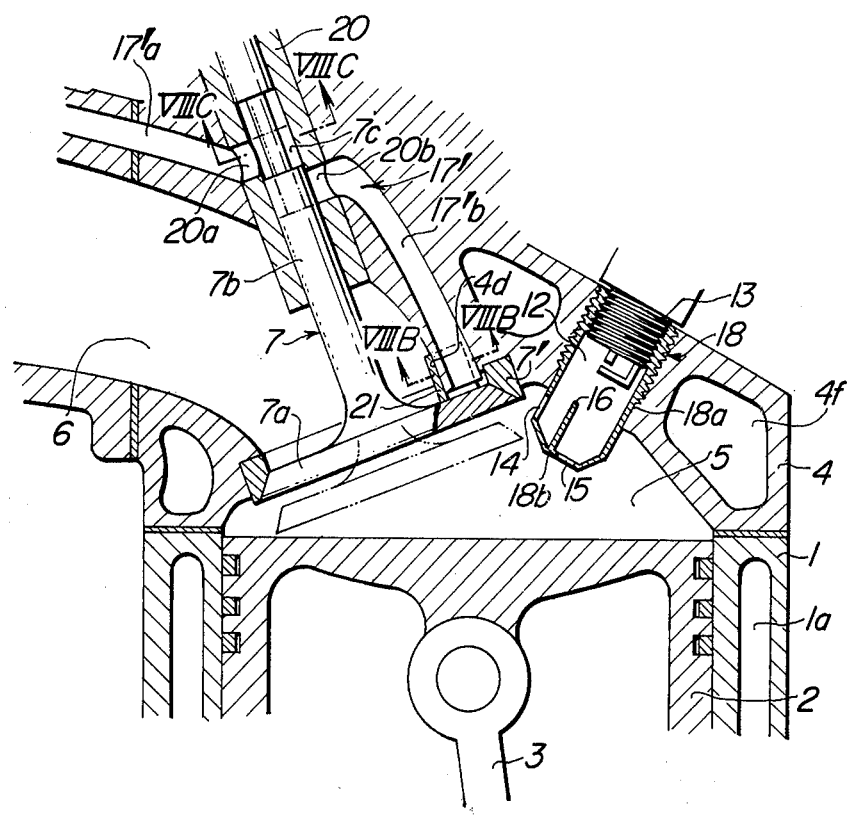
FIG. 8A is a fragmentary sectional view of a still further modified torch ignition type internal combustion engine.

The engines shown in FIGS. 7 and 8A have the suction passages 17 for the rich mixture which are designed to be opened and closed by intake valves 7 in synchronism with the opening and closing of the suction ports 6 by the intake valves 7. This is achieved by valving the rich mixture passages either at their open ends (in FIG. 7) or at their intermediate portions of the suction passage 17' (in FIG. 8). These engines will be described in more detail hereunder.

Referring to FIG. 7, the rich mixture passage is in the form of a suction passage 17 disposed in a suction port 6. The suction passage 17 opens at an opening in the suction port which is adapted to contact with a part of the back face of a head 7*a* of an intake valve 7 which is disposed adjacent to a trap chamber 12 when the valve is closed. Accordingly, the inner open end of the suction passage 17 is opened and closed by the valve head 7*a* in synchronism with the opening and closing of the suction port 6 by the valve 7, respectively.

Figure 8B:
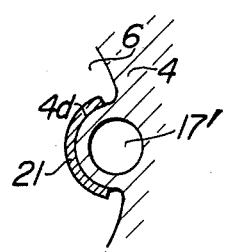
FIG. 8B is a fragmentary sectional view of the engine illustrated in FIG. 8A taken along line VIIIB — VIIIB in FIG. 8A.
Figure 8C:
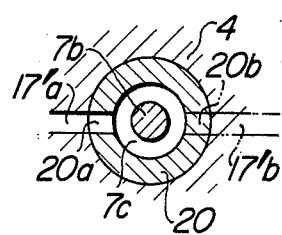
FIG. 8C is a fragmentary sectional view of the engine illustrated in FIG. 8A taken along line VIIIC — VIIIC in FIG. 8A.

Referring to FIGS. 8A, 8B and 8C, an intake valve 7 has a stem 7*b* which is formed into a shutoff valve for opening and closing a rich mixture passage 17' between its ends. The valve stem 7*b* slidably moves through a valve guide 20 in conventional manner. A part of the valve stem 7*b* of the valve 7 which extends within the valve guide 20 is of a reduced diameter, as seen in FIG. 8C, to provide an annular groove 7*c* which has a predetermined axial length. The valve guide 20 is formed therein with a pair of ports 20*a* and 20*b* which are positioned diametrically on opposite sides of the stem 7*b* and displaced axially such a distance that the communication between the ports 20*a* and 20*b* is shut off by the valve stem 7*b* of the intake valve 7 when it is in the closed position, as shown by solid lines in FIG. 8A, but the ports 20*a* and 20*b* are communicated by means of the annular groove 7*c* in the valve stem 7*b* when the intake valve 7 is moved to its open position, as shown by broken lines in FIG. 8A.

It will be apparent to those skilled in the art that the annular groove 7c is not necessarily required to extend completely around the periphery of the valve stem 7b. One of the ports 20a is communicated with an upstream part 17'a of a suction passage 17' while the other port 20b is in communication with a downstream part 17'b of the suction passage 17'. The engine shown in FIG. 8A is water-cooled engine and thus has a cylinder 1 and a cylinder head 4 which are formed therein with water passages 1a and 4f, respectively.

The suction passages 17 and 17' in the engines shown in FIGS. 7 and 8 are closed during the strokes other than the suction stroke. This feature is particularly useful in multi-cylinder engines. It will be understood that, even if a cylinder of a multi-cylinder engine is being subjected to a stroke other than suction stroke, the suction port of the cylinder will be subjected to vacuum pressure if the piston of another cylinder is in its suction stroke. This is due to the fact that the suction stroke of the piston of the other cylinder produces a vacuum in the suction port of said the other cylinder which vacuum pressure in turn is transmitted to the suction ports of the first and another cylinders. Thus, if the suction passage 17 or 17' were always opened to an associated suction port 6, the rich mixture will be always continuously delivered from the suction passage 17 or 17' to an associated suction port under the vacuum pressure produced in the suction stroke of the piston in the associated cylinder and by succeeding suction strokes of the pistons in other cylinders, with a disadvantageous influence on the distribution of the rich mixture to every trap chamber and with an increase in the air-fuel ratio variation of every trap chamber. However, since the suction passages 17 and 17' of the engines are in fact closed during the strokes other than the suction stroke in one cylinder, the rich mixture is fed only to the cylinder or cylinders under the suction stroke, with the advantageous result that equal flow of the rich mixture is successively distributed to cylinders when they are brought in the suction strokes and that two stratified mixtures are surely formed in each cylinder during its suction and compression strokes because the rich mixture is not delivered to the suction ports of the cylinders during their strokes other than the suction stroke.

The engine shown in FIGS. 8A to 8C is provided with means for ensuring the introduction of the rich mixture from the suction passage 17' through a suction aperture 14 into a trap chamber 12. This means comprises a guide member or plate 21 provided on the part of the back face of the valve head 7a adjacent to the trap chamber 12 and extending substantially in parallel with the valve stem 7b. The guide plate 21 has an arcuate cross-section as shown in FIG. 8B. The cylinder head 4 is provided with a corresponding wall 4d having a cross-section substantially complementary to that of the guide plate 21. The guide plate 21 is in contact with the wall 4d and slidable thereon as the valve head 7a is reciprocated. The guide plate 21 has such a size that a part of the plate is still in contact with the wall 4d even when the guide plate 21 is moved down in the full opening of the valve 7. The guide plate 21 is not limited to an arcuate cross-section and may have any other convenient shape such as, for example, a hook-like shape in section. When the intake valve 7 is opened, the rich mixture delivered from the suction passage 17' is guided by the guide plate 21 and by the peripheral edge of the valve head 7a of the intake valve 7 toward the suction aperture 14 through which the rich mixture is introduced into the trap chamber 12.

Figure 9:
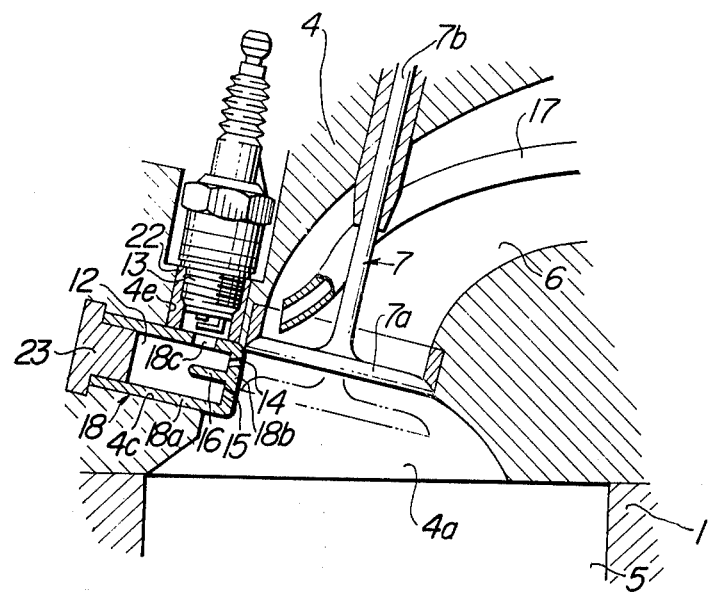
FIG. 9 is a fragmentary sectional view of a still further modified torch ignition type internal combustion engine.
Figure 10:
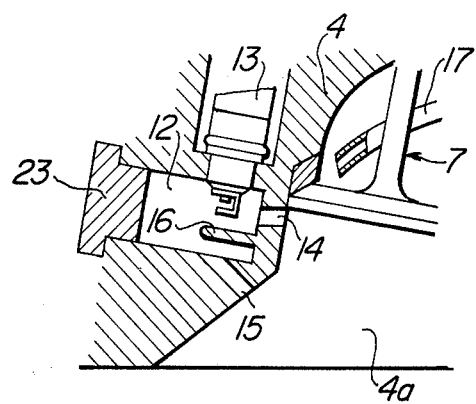
FIG. 10 is a fragmentary sectional view of a still further modified torch ignition type internal combustion engine.

In the engines shown in FIGS. 9 and 10, electrodes of spark plugs are disposed adjacent to either suction apertures 14 of trap chambers 12 or discharge apertures 15 thereof. More specifically, the engine shown in FIG. 9 has a cylinder head 4 in which is formed a bore 4c for receiving or housing a casing 18 which defines a trap chamber 12 therein. The cylinder head 4 is also formed therein with a second bore 4e extending perpendicularly to the axis of the first bore 4c. The second bore 4e receives a sleeve 22 into which a spark plug 13 is screwed. The sleeve 22 defines therein a chamber which is communicated with the trap chamber 12 through an opening 18c formed in a cylindrical portion 18a of the casing 18. The opening 18c is so positioned that the chamber defined by the sleeve 22 is communicated with a part of the trap chamber 12 which is adjacent to the suction aperture 14 of the trap chamber 12. The bore 4e receiving the sleeve 22 is correspondingly positioned. The electrodes of the spark plug do not project into the trap chamber 12 but are housed in the sleeve 22.

The engine shown in FIG. 10 is similar to the engine in FIG. 9 with respect to the feature that a spark plug 13 has its electrodes disposed adjacent a suction aperture 14 of a trap chamber 12. In the FIG. 10 engine, however, the spark plug 13 has its electrodes extending into the trap chamber 12.

In both engines in FIGS. 9 and 10, the trap chambers 12 have outer open ends closed by caps or closure members 23 screwed into the trap chambers. In an alternative modification, the spark plugs 13 may be so positioned that the electrodes thereof are disposed adjacent to the discharge apertures 15 rather than the suction aperture 14.

With the engine shown in FIG. 9, since the electrodes of the spark plug 13 do not project into the trap chamber 12, the electrodes are advantageously prevented from being watted by the rich mixture introduced into the trap chamber 12 through the suction aperture 14. In addition, the ignition energy of the initial combustion in the trap chamber is prevented from being scattered with an advantageous result that a stable flame kernel is reliably formed at each time of ignition. On the other hand, in the engine shown in FIG. 10, the electrodes of the plug 13 extend into the trap chamber 12 and are disposed substantially in alignment with the suction aperture 14 of the trap chamber 12. Thus, the plug electrodes are placed in the path of the flow of a fresh charge of rich mixture flowing at a high velocity so that the flesh mixture charge is moved into contact with the electrodes with an improvement in the ignition.

It will be seen from the foregoing description that the present invention advantageously achieves stratified combustion to reduce the emission of harmful exhaust gases with minor changes to the conventional internal combustion engine.

What is claimed is:

1. A method of operating a torch ignition type internal combustion engine having a main combustion chamber, an intake port connected to said main combustion chamber, a trap chamber provided with first and second apertures through which said chamber is communicated with said main combustion chamber, and a spark plug having a set of electrodes exposed to said trap chamber, said method including the steps of:

a. supplying an air-fuel mixture into said main combustion chamber through said intake port during a suction stroke of said engine;
b. introducing a portion of said air-fuel mixture through said first aperture into said trap chamber during said suction stroke of said engine;
c. substituting in said trap chamber said portion of said air-fuel mixture for residual gases produced in said trap chamber during the preceding combustion stroke of said engine to discharge said residual gases through said second aperture to thereby scavenge said trap chamber;
d. preventing a forced scavenging flow of said portion of said air-fuel mixture within the area of said trap chamber remote from said first and second apertures during the compression stroke of said engine;
e. igniting said air-fuel mixture in said trap chamber to produce a combustion flame therein;
f. spurting said combustion flame in the form of torch jets from said trap chamber into said main combustion chamber through said first and second apertures; and
g. burning, by said torch jets, said air-fuel mixture supplied to said main combustion chamber to produce power therein.

2. A method of operating a torch ignition type internal combustion engine having a main combustion chamber, an intake port connected to said main combustion chamber, and a trap chamber provided with first and second apertures through which said trap chamber is communicated with said main combustion chamber, said method including the steps of:
a. supplying an air-fuel mixture into said main combustion chamber through said intake port during a suction stroke of said engine;
b. introducing a portion of said air-fuel mixture through said first aperture into said trap chamber during said suction stroke of said engine;
c. substituting in said trap chamber said portion of said air-fuel mixture for residual gases produced in said trap chamber during the preceding combustion stroke of said engine to discharge said residual gases through said second aperture to thereby scavenge said trap chamber;
d. maintaining the pressure differential between said first and second apertures sufficiently small to prevent a forced scavenging flow of said portion of said air-fuel mixture in said trap chamber during the compression stroke of said engine;
e. igniting said air-fuel mixture in said trap chamber to produce a combustion flame therein;
f. spurting said combustion flame in the form of torch jets from said trap chamber into said main combustion chamber through said first and second apertures; and
g. burning, by said torch jets, said air-fuel mixture supplied to said main combustion chamber to produce power therein.

3. A method of operating a torch ignition type internal combustion engine including a cylinder, a cylinder head cooperating with said cylinder to define a main combustion chamber, an intake valve having a valve stem and a valve head connected thereto, first means for producing a lean air-fuel mixture, second means for producing a rich air-fuel mixture, an intake port for operatively communicating said first means with said main combustion chamber via said intake valve, a passage for communicating said second means with a portion within said intake port upsteam of said intake valve, a pot-shaped trap chamber disposed in said cylinder head and having first and second apertures, said first and second apertures being communicated with said main combustion chamber during the compression and ignition stroke of said engine, and a spark plug having a set of electrodes exposed to said trap chamber, said method comprising the steps of:
a. supplying a charge of lean air-fuel mixture into said main combustion chamber through said intake port during a suction stroke of said engine;
b. introducing via said passage another charge of rich air-fuel mixture through said first aperture into said trap chamber during said suction stroke of said engine;
c. substituting in said trap chamber said another charge of rich air-fuel mixture for residual gases produced in said trap chamber during the preceding combustion stroke of said engine to discharge said residual gases through said second aperture to thereby scavenge said trap chamber;
d. maintaining a substantial amount of said portion of said air-fuel mixture in said trap chamber during the compression stroke of said engine by maintaining the pressure at said first and second apertures substantially equal during said compression stroke;
e. igniting said substantial amount of said air-fuel mixture in said trap chamber to produce a combustion flame therein;
f. spurting said combustion flame in the form of torch jets from said trap chamber into said main combustion chamber through said first and second apertures; and
g. burning, by said torch jets, said charge of lean air-fuel mixture supplied to said main combustion chamber to produce power therein.

4. A method of operating a torch ignition type internal combustion engine having a main combustion chamber, an intake port connected to said main combustion chamber, a trap chamber provided with first and second apertures through which said trap chamber is communicated with said main combustion chamber, and a spark plug having a set of electrodes exposed to said trap chamber, said method including the steps of:
a. supplying a lean air-fuel mixture into said main combustion chamber through said intake port during a suction stroke of said engine;
b. introducing a rich air-fuel mixture through said first aperture into said trap chamber during said suction stroke of said engine;
c. discharging residual gases produced in said trap chamber during the preceding combustion stroke of said engine through said second aperture by said rich air-fuel mixture during said suction stroke of said engine;
d. preventing a forced scavenging flow of said portion of said air-fuel mixture within the area of said trap chamber remote from said first and second apertures during the compression stroke of said engine;
e. igniting said rich air-fuel mixture in said trap chamber to produce a combustion flame therein;
f. spurting said combustion flame in the form of torch jets from said trap chamber into said main combustion chamber through said first and second apertures; and g. burning, by said torch jets, said charge of lean air-fuel mixture supplied to said main combustion chamber to produce power therein.

5. A method of operating a torch ignition type internal combustion engine including a cylinder, a cylinder head cooperating with said cylinder to define a main combustion chamber, an intake valve having a valve stem and a valve head connected thereto, first means for producing a lean air-fuel mixture, second means for producing a rich air-fuel mixture, an intake port for operatively communicating said first means with said main combustion chamber via said intake valve, a passage for communicating said second means with a portion within said intake port upsteam of said intake valve, a pot-shaped trap chamber disposed in said cylinder head and having first and second apertures, said first and second apertures being communicated with said main combustion chamber during the compression and ignition stroke of said engine, and a spark plug having a set of electrodes exposed to said trap chamber, said method comprising the steps of:
  a. supplying a charge of lean air-fuel mixture into said main combustion chamber through said intake port during a suction stroke of said engine;
  b. introducing via said passage another charge of rich air-fuel mixture through said first aperture into said trap chamber during said suction stroke of said engine;
  c. substituting in said trap chamber said another charge of rich air-fuel mixture for residual gases produced in said trap chamber during the preceding combustion stroke of said engine to discharge said residual gases through said second aperture to thereby scavenge said trap chamber;
  d. preventing a forced scavenging flow of said portion of said air-fuel mixture within the area of said trap chamber remote from said first and second apertures during the compression stroke of said engine;
  e. igniting said part of said another charge of rich air-fuel mixture in said trap chamber to produce a combustion flame therein;
  f. spurting said combustion flame in the form of torch jets from said trap chamber into said main combustion chamber through said first and second apertures; and
  g. burning, by said torch jets, said charge of lean air-fuel mixture supplied to said main combustion chamber to produce power therein.

6. A method of operating an internal combustion engine as claimed in claim 3, further including the step of:
  supplying said another charge of air-fuel mixture toward said first aperture through a passage at least a part of which is independent of said intake port.

7. A method of operating an internal combustion engine as claimed in claim 3, further including the steps of:
  supplying said another charge of air-fuel mixture toward said first aperture through a passage at least a part of which is independent of said intake port; and
  closing said passage by said intake valve when it is moved to its closed position.

8. A method of operating an internal combustion engine as claimed in claim 3, wherein said substituting step includes a further step of causing said another charge of air-fuel mixture introduced into said trap chamber through said first aperture and said residual gases being discharged from said trap chamber through said second aperture to flow within said trap chamber in a stratified fashion.

9. A method of operating an internal combustion engine as claimed in claim 3, wherein said another charge of air-fuel mixture is richer than the first-mentioned charge of air-fuel mixture.

10. A method of operating an internal combustion engine as claimed in claim 6, wherein said another charge of air-fuel mixture is richer than the first-mentioned charge of air-fuel mixture.

11. A method of operating an internal combustion engine as claimed in claim 3, wherein said introducing step includes a further step of guiding said another charge of air-fuel mixture introduced into said trap chamber to the vicinity of a set of electrodes of a spark plug which is exposed to said trap chamber.

12. A method of operating an internal combustion engine as claimed in claim 3, further including the steps of:
  moving, prior to said introducing step, an intake valve of said engine to a position in which said first aperture in said trap chamber is positioned substantially in juxtaposed relationship with the valve head of said intake valve; and
  guiding, by a part of the back face of said valve head, said another charge of air-fuel mixture from said intake port to said first aperture.

13. A method of operating a torch ignition type internal combustion engine as claimed in claim 1, wherein said introducing step includes a further step of guiding said portion of said air-fuel mixture introduced into said trap chamber through said first aperture to the vicinity of a set of electrodes of a spark plug which is disposed in said trap chamber.

14. A method of operating a torch ignition type internal combustion engine as claimed in claim 1, further including the steps of:
  moving, prior to said introducing step, an intake valve of said engine to a position in which said first aperture in said trap chamber is positioned above the valve head of said intake valve; and
  guiding, by a part of the back face of said valve head, said portion of said air-fuel mixture from said intake port to said first aperture.

15. A method of operating a torch ignition type internal combustion engine as claimed in claim 3, wherein said introducing step includes a further step of guiding said another charge of rich air-fuel mixture introduced into said trap chamber through said first aperture to the vicinity of said set of electrodes of said spark plug.

16. A method of operating a torch ignition type internal combustion engine as claimed in claim 3, further including the steps of:
  moving, prior to said introducing step, said intake valve to a position in which said first aperture in said trap chamber is positioned above the valve head of said intake valve; and
  guiding, by a part of the back face of said valve head, said another charge of rich air-fuel mixture from said passage to said first aperture.

* * * * *